(12) United States Patent
Kowalewski et al.

(10) Patent No.: US 11,425,201 B2
(45) Date of Patent: Aug. 23, 2022

(54) FAST DATA CONNECTION SYSTEM AND METHOD

(71) Applicant: R-Stor Inc., Saratoga, CA (US)

(72) Inventors: Damian Kowalewski, Sunnyvale, CA (US); Giovanni Coglitore, Saratoga, CA (US); Roger Levinson, San Jose, CA (US)

(73) Assignee: R-Stor Inc., Saratoga, CA (US)

( * ) Notice: Subject to any disclaimer, the term of this patent is extended or adjusted under 35 U.S.C. 154(b) by 0 days.

(21) Appl. No.: 16/430,161

(22) Filed: Jun. 3, 2019

(65) Prior Publication Data

US 2019/0373063 A1 Dec. 5, 2019

Related U.S. Application Data

(60) Provisional application No. 62/680,948, filed on Jun. 5, 2018.

(51) Int. Cl.
*H04L 67/141* (2022.01)
*H04L 67/1008* (2022.01)
*H04L 69/14* (2022.01)
*H04L 69/16* (2022.01)

(52) U.S. Cl.
CPC ........ *H04L 67/141* (2013.01); *H04L 67/1008* (2013.01); *H04L 69/14* (2013.01); *H04L 69/161* (2013.01)

(58) Field of Classification Search
CPC . H04L 67/141; H04L 67/145; H04L 67/1004; H04L 67/1002; H04L 67/104; H04L 67/42; H04L 67/1008; H04L 69/14; H04L 69/161; H04L 65/1069; H04L 29/06; H04L 29/02; H04L 29/12; H04L 29/14; H04L 12/66; H04L 61/1511; H04L 63/0281; H04L 69/141; H04W 76/00; G06F 9/5027; G06F 9/5083; G06F 11/16; G06F 16/10; G06F 15/16; G06F 15/173; H04N 21/23103

See application file for complete search history.

(56) References Cited

U.S. PATENT DOCUMENTS

| | | | | |
|---|---|---|---|---|
| 6,078,960 A | * | 6/2000 | Ballard | ............... H04L 67/1008 709/203 |
| 6,144,996 A | * | 11/2000 | Starnes | .................. G06K 9/222 709/217 |
| 6,304,913 B1 | * | 10/2001 | Rune | ................. H04L 29/12066 709/241 |
| 6,820,133 B1 | * | 11/2004 | Grove | ............... H04L 29/12066 709/238 |

(Continued)

OTHER PUBLICATIONS

Yong Wan et al., An In-depth Analysis of TCP and RDMA Performance on Modern Server Platform, (Jun. 1, 2012), 2012 IEEE Seventh International Conference on Networking, Architecture, and Storage, pp. 164-171 (Year: 2012).*

(Continued)

*Primary Examiner* — Nam T Tran
(74) *Attorney, Agent, or Firm* — Rankin, Hill & Clark LLP

(57) ABSTRACT

Systems and apparatus for implementation and management of a fast data connection in a computer network and methods for making and using the same. In various embodiment, these technologies are used to facilitate fast data exchanges between network nodes among other things.

18 Claims, 2 Drawing Sheets

(56) References Cited

U.S. PATENT DOCUMENTS

| | | | |
|---|---|---|---|
| 7,111,300 B1* | 9/2006 | Salas | H04L 67/1008 |
| | | | 709/203 |
| 7,493,371 B1* | 2/2009 | Bali | H04L 67/14 |
| | | | 709/203 |
| 8,661,130 B2* | 2/2014 | Sonoda | G06F 9/5061 |
| | | | 709/226 |
| 9,213,953 B1* | 12/2015 | Kassmann | G06Q 10/0631 |
| 9,602,424 B1* | 3/2017 | Vincent | H04L 67/1008 |
| 9,747,249 B2* | 8/2017 | Cherian | H04L 45/64 |
| 9,942,341 B2* | 4/2018 | Fleming | H04L 67/141 |
| 2011/0235508 A1* | 9/2011 | Goel | H04L 67/1027 |
| | | | 370/230 |
| 2015/0039793 A1 | 2/2015 | Rossetti | |
| 2015/0163161 A1* | 6/2015 | Arikatla | H04L 67/1008 |
| | | | 709/226 |
| 2015/0237104 A1* | 8/2015 | Oguchi | H04L 65/608 |
| | | | 709/231 |
| 2015/0288763 A1 | 10/2015 | Kamper et al. | |
| 2015/0365506 A1 | 12/2015 | Pandit et al. | |
| 2017/0357611 A1 | 12/2017 | Cherian et al. | |
| 2018/0048569 A1 | 2/2018 | Sajeepa et al. | |

OTHER PUBLICATIONS

WO, International Search Report & Written Opinion, Application No. PCT/US2019/034658, dated Sep. 19, 2019.

* cited by examiner

FAST DATA CONNECTION SYSTEM AND METHOD

CROSS-REFERENCE TO RELATED APPLICATIONS

This application claims the benefit of, and priority to, U.S. Provisional Application Ser. No. 62/680,948, filed Jun. 5, 2018, the disclosure of which is hereby incorporated herein by reference in its entirety and for all purposes.

FIELD

The present disclosure relates generally to digital data processing and more particularly, but not exclusively, to systems and methods for providing a fast data connection between network components.

BACKGROUND

Conventional computer networks comprise a plurality of interconnected servers, computers and other network components. The various network components can communicate in a wired and/or wireless manner. As a part of this communication, data is exchanged among the network components typically via data packets in accordance with a communication protocol standard, such as Transmission Control Protocol (TCP) and/or User Datagram Protocol (UDP). The same communication protocol standard is used to transmit the data packets as the data packets traverse the computer network from a source network component to a destination network component.

Exchanging data via conventional communication protocol standards, however, can be problematic. These communication protocol standards introduce data loss, latency and throughput issues during transmission of data packets. UDP, for example, is an unreliable, connectionless protocol that can result in data loss, errors or duplication. Likewise, TCP uses an in-packet checksum for end-to-end reliability, which is expensive and creates bottlenecks in packet processing.

In view of the foregoing, a need exists for an improved data communication system and method for integrating servers, computers and other network components in an effort to overcome the aforementioned obstacles and deficiencies of conventional computer networks.

Figure 1:
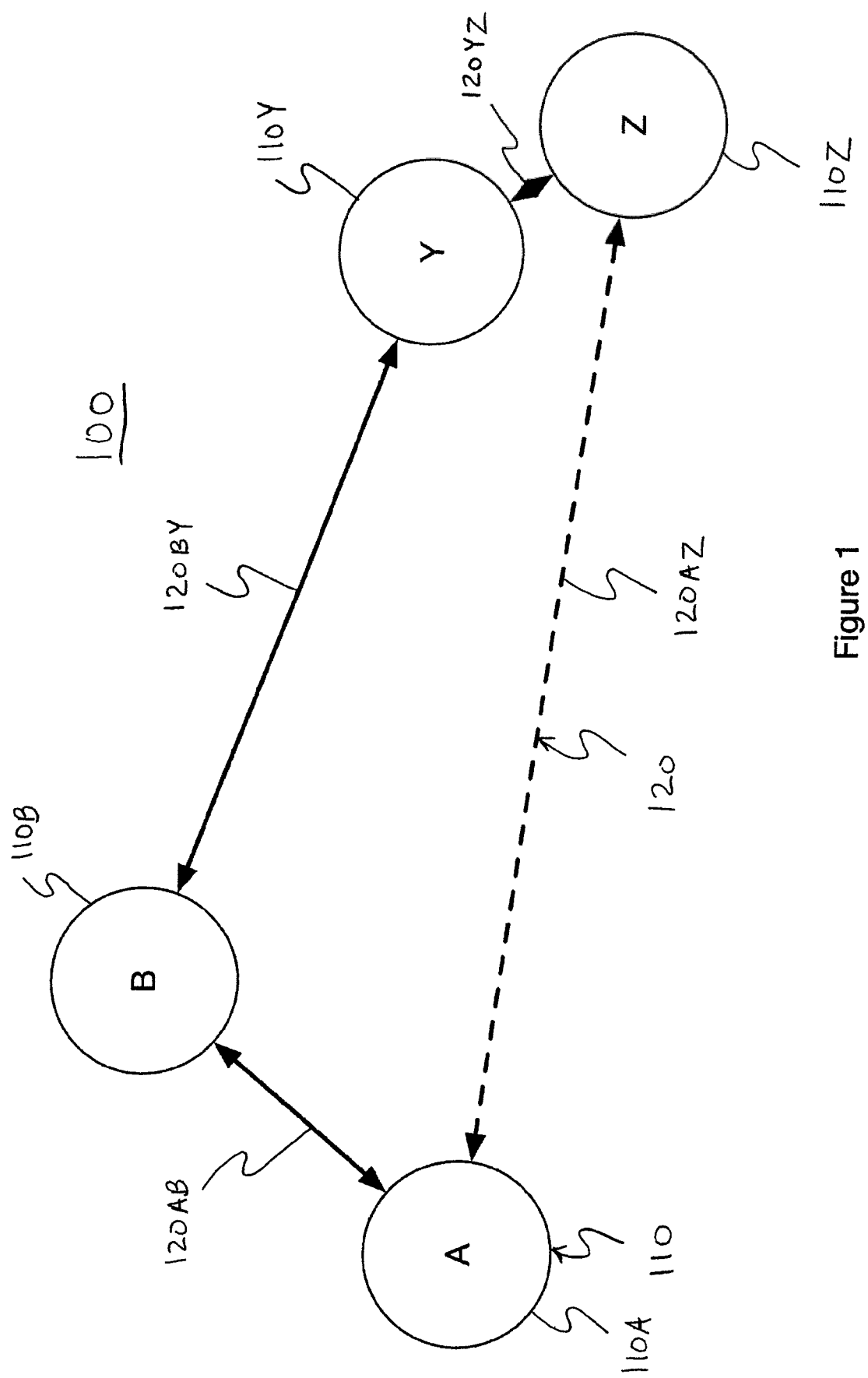
FIG. 1 is an exemplary top-level drawing illustrating an embodiment of a fast data connection system for enabling data to be exchanged between a first and second network components via a predetermined network path comprising one or more intermediate network components.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available computer networks introduce data loss, latency and throughput issues during data transmission, a fast data connection system that enables data to be exchanged between a first and second network components via a predetermined network path can prove desirable and provide a basis for a wide range of computer applications, such as computer networks with wireless and/or wired connections. This result can be achieved, according to one embodiment disclosed herein, by a fast data connection system 100 as illustrated in FIG. 1.

Turning to FIG. 1, the fast data connection system 100 is shown as including a plurality of interconnected network components (or resources). These network components include server systems 110 that are configured to communicate with one or more other server systems 110 via at least one communication connection 120. Each server system 110 can comprise a computer or a computer program for managing access to a centralized resource (or service) in the network; whereas, each communication connection 120 can support one or more selected communication protocols and preferably comprises a bi-directional communication connection. The fast data connection system 100 can include any predetermined number of network components, which can be arranged in any desired configuration.

For purposes of illustration only, the fast data connection system 100 of FIG. 1 includes a first server 110A that can communicate with a second server 110Z via a communication connection 120AZ and/or can communicate with a first intermediate server 110B via a communication connection 120AB. The second server 110Z similarly can communicate with the first server 110A via the communication connection 120AZ and/or can communicate with a second intermediate server 110Y via a communication connection 120YZ. In addition, the first intermediate server 110B and the second intermediate server 110Y likewise can communicate via a communication connection 120BY. Stated somewhat differently, the first and second servers 110A, 110Z can communicate directly via the communication connection 120AZ or indirectly via the first and second intermediate servers 110B, 110Y.

Advantageously, the first and second intermediate servers 110B, 110Y can be configured to greatly accelerate data exchanges between the first and second servers 110A, 110Z. Accordingly, data exchanges between the first and second servers 110A, 110Z preferably are conducted via the first and second intermediate servers 110B, 110Y rather than directly via the communication connection 120AZ. Thereby, data transmitted by the first server 110A can be sent to first intermediate server 110B, which forwards the transmitted data to the second intermediate server 110Y via the communication connection 120BY. The second intermediate server 110Y then can forward the transmitted data to the second server 110Z.

The first intermediate server 110B, for example, can be selected to minimize data transfer latency between the first server 110A and the first intermediate server 110B. In other words, the communication connection 120AB can be selected to optimize the data latency and/or bandwidth between the first server 110A and the first intermediate server 110B. In one embodiment, the first intermediate server 110B can be geographically proximate to the first server 110A to help ensure that the data latency is minimized. Data thereby can be exchanged between the first server 110A and the first intermediate server 110B via a selected conventional communication protocol standard, such as Transmission Control Protocol (TCP) and/or User Datagram Protocol (UDP), without limitation.

Similarly, the second intermediate server 110Y can be selected to minimize data transfer latency between the second server 110Z and the second intermediate server 110Y. Stated somewhat differently, the communication connection 120YZ can be selected to optimize the data latency and/or bandwidth between the second server 110Z and the second intermediate server 110Y. In one embodiment, the second intermediate server 110Y can be geographically proximate to the second server 110Z to help ensure that the data latency is minimized. Data thereby can be exchanged between the second server 110Z and the second intermediate server 110Y via a selected conventional communication protocol standard, such as Transmission Control Protocol (TCP) and/or User Datagram Protocol (UDP), without limitation.

To help facilitate the accelerate data exchanges between the first and second servers 110A, 110Z, the communication connection 120BY between the first intermediate server 110B and the second intermediate server 110Y preferably comprises a high speed (or low latency) communication connection. In selected embodiments, the high-speed communication protocol standards can include a multi-path communication protocol standard. Exemplary communication connection 120BY can support a selected high-speed (and/or multi-path) communication protocol standard, such as Remote Direct Memory Access (RDMA), RDMA over Converged Ethernet (RoCE), InfiniBand (IB) or any combination thereof, without limitation.

Figure 2:
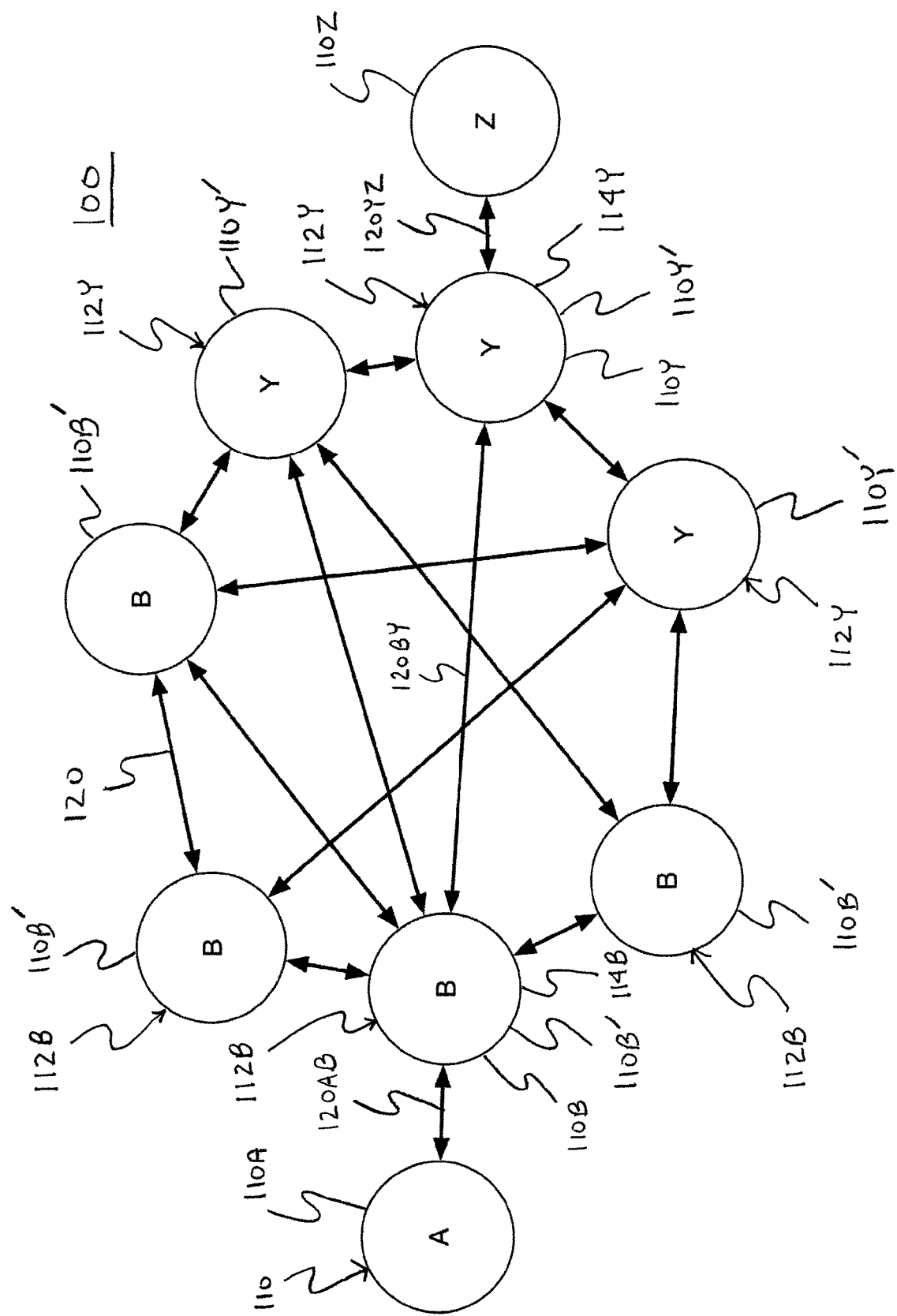
FIG. 2 is an exemplary top-level drawing illustrating an alternative embodiment of the fast data connection system of FIG. 1, wherein a plurality of potential predetermined network paths are available for exchanging data between the first and second network components.

Turning to FIG. 2, an alternative embodiment of the fast data connection system 100 is shown. The fast data connection system 100 is provided in the manner set forth in more detail above with reference to FIG. 1 and includes a plurality of potential (or available or candidate) first intermediate servers 110B' and/or a plurality of potential (or available or candidate) second intermediate servers 110Y'. Stated somewhat differently, the fast data connection system 100 can include a first pool 112B of available first intermediate servers 110B' and/or a second pool 112Y of available second intermediate servers 110Y'.

Each available first intermediate server 110B' can communicate with the first server 110A via respective communication connections 120 and can communicate with at least one other available first intermediate server 110B' and/or at least one available second intermediate server 110Y' via respective communication connections 120. Each available first intermediate server 110B' is a candidate for selection as the first intermediate server 110B based upon the relative data latency and/or bandwidth of the communication connections 120 between the first server 110A and the respective available first intermediate servers 110B'.

In one embodiment, the first intermediate server 110B can comprise a selected first intermediate server 114B from among the first pool 112B of the available first intermediate servers 110B'. The selection of the first intermediate server 110B, for example, can comprise a static selection in which the selected first intermediate server 114B is permanently selected as the first intermediate server 110B. Additionally and/or alternatively, the selection of the first intermediate server 110B can comprise a dynamic selection in which selection of the selected first intermediate server 114B from among the first pool 112B of the available first intermediate servers 110B' can change over time.

The selection of the first intermediate server 110B can be based upon any predetermined criteria. Exemplary predetermined criteria can include, but are not limited to, time-based criteria and/or event-based criteria. For example, the selection of the first intermediate server 110B can occur periodically, such as daily, monthly, etc., and/or can occur based upon occurrence of a predetermined event, such as a power outage and/or an earthquake, proximate to one or more of the available first intermediate servers 110B' in the first pool 112B.

Similarly, each available second intermediate server 110Y' can communicate with the second server 110Z via respective communication connections 120 and can communicate with at least one other available first intermediate server 110B' and/or at least one available second intermediate server 110Y' via respective communication connections 120. Each available second intermediate server 110Y' is a candidate for selection as the second intermediate server 110Y based upon the relative data latency and/or bandwidth of the communication connections 120 between the second server 110Z and the respective available second intermediate servers 110Y'.

In one embodiment, the second intermediate server 110Y can comprise a selected second intermediate server 114Y from among the second pool 112Y of the available second intermediate servers 110Y'. The selection of the second intermediate server 110Y, for example, can comprise a static selection in which the selected second intermediate server 112Y is permanently selected as the second intermediate server 110Y. Additionally and/or alternatively, the selection of the second intermediate server 110Y can comprise a dynamic selection in which selection of the selected second intermediate server 114Y from among the second pool 112Y of the available second intermediate servers 110Y' can change over time.

The selection of the second intermediate server 110Y can be based upon any predetermined criteria. Exemplary predetermined criteria can include, but are not limited to, time-based criteria and/or event-based criteria. For example, the selection of the second intermediate server 110Y can occur periodically, such as daily, monthly, etc., and/or can occur based upon occurrence of a predetermined event, such as a power outage or an earthquake, proximate to one or more of the available second intermediate servers 110Y' in the second pool 112Y.

Although various implementations are discussed herein and shown in the figures, it will be understood that the principles described herein are not limited to such. For example, while particular scenarios are referenced, it will be understood that the principles described herein apply to any suitable type of computer network, including, but not limited to, a Local Area Network (LAN), a Wide Area Network (WAN), a Wireless Local Area Network (WLAN), a Metropolitan Area Network (MAN) and/or a Campus Area Network (CAN).

Accordingly, persons of ordinary skill in the art will understand that, although particular embodiments have been illustrated and described, the principles described herein can be applied to different types of computer networks. Certain embodiments have been described for the purpose of simplifying the description, and it will be understood to persons skilled in the art that this is illustrative only. It will also be understood that reference to a "server," "computer," "network component" or other hardware or software terms herein can refer to any other type of suitable device, component, software, and so on. Moreover, the principles discussed herein can be generalized to any number and configuration of systems and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of particular inventions.

What is claimed is:

1. A method for providing a fast data connection between network components, comprising:
dynamically selecting a first intermediate server from a first pool of available first intermediate servers on a periodic basis between a week and a month, inclusively, and based upon a predetermined event-based criteria occurring proximate to one or more of the available first intermediate servers in the first pool, wherein the predetermined event-based criteria includes occurrence of a power outage or an earthquake proximate to the one or more of the available first intermediate servers in the first pool, the available first intermediate servers each being configured for communicating with a first network component via respective first communication connections;
dynamically selecting a second intermediate server from a second pool of available second intermediate servers on a periodic basis between a week and a month, inclusively, the available second intermediate servers each being configured for communicating with a second network component via respective second communication connections;
providing a first communication connection between the selected first intermediate server and a first network component;
establishing a high-speed communication connection between the first selected intermediate server and the selected second intermediate server; and
establishing a direct communication connection between the first network component and the second network component,
wherein data exchanges between the first and second network components are conducted via at least one of the high-speed communication connection and the direct communication connection and are accelerated via the selected first and second intermediate servers.

2. The method of claim 1, wherein said providing the first communication connection includes optimizing data transfer latency, bandwidth or both between the selected first intermediate server and the first network component.

3. The method of claim 1, wherein the first communication connection supports one or more conventional communication protocol standards.

4. The method of claim 3, wherein the conventional communication protocol standards include Transmission Control Protocol (TCP), User Datagram Protocol (UDP) or both.

5. The method of claim 1, further comprising providing a second communication connection between the selected second intermediate server and the second network component.

6. The method of claim 5, wherein said providing the second communication connection includes optimizing data transfer latency, bandwidth or both between the selected second intermediate server and the second network component.

7. The method of claim 1, wherein said establishing the high-speed communication connection includes establishing the high-speed communication connection with one or more multi-path communication protocol standards.

8. The method of claim 7, wherein the multi-path communication protocol standards include Remote Direct Memory Access (RDMA), RDMA over Converged Ethernet (RoCE), InfiniBand (IB), or a combination thereof.

9. The method of claim 1, wherein said selecting the first intermediate server includes optimizing data transfer latency, bandwidth or both between the selected first intermediate server and the first network component.

10. The method of claim 1, wherein said selecting the second intermediate server includes optimizing data transfer latency, bandwidth or both between the selected second intermediate server and the second network component.

11. The method of claim 1, wherein each of the high-speed communication connections supports high-speed communications between one of the first intermediate servers and one of the second intermediate servers.

12. The method of claim 1, wherein the first network component comprises a server system for managing access to a first centralized network resource.

13. The method of claim 12, wherein the second network component comprises a server system for managing access to a second centralized network resource.

14. The method of claim 1, wherein said establishing the direct communication connection comprises dynamically establishing the direct communication connection.

15. A computer program product for providing a fast data connection between network components, the computer program product being encoded on one or more non-transitory machine-readable storage media and comprising:
instruction for dynamically selecting a first intermediate server from a first pool of available first intermediate servers each being configured for communicating with a first network component via respective first communication connection, wherein the instruction for dynamically selecting the first intermediate server is performed on a periodic basis between a week and a month, inclusively, and performed based upon a predetermined event-based criteria occurring proximate to one or more of the available first intermediate servers in the first pool, wherein the predetermined event-based criteria includes occurrence of a power outage or an earthquake proximate to the one or more of the available first intermediate servers in the first pool;
instruction for dynamically selecting a second intermediate server from a second pool of available second intermediate servers each being configured for communicating with a second network component via respective second communication connections on a periodic basis between a week and a month, inclusively;
instruction for enabling a high-speed communication connection between the selected first intermediate server and the selected second intermediate server; and
instruction for enabling a direct communication connection between the first network component and the second network component,
wherein data exchanges between the first and second network components are conducted via at least one of the high-speed communication connection and the direct communication connection and are accelerated via the first and second intermediate servers.

16. The computer program product of claim 15, wherein said instruction for enabling the direct communication connection comprises instruction for dynamically enabling the direct communication connection between the first network component and the second network component.

17. A system for providing a fast data connection between network components, comprising:
- a first intermediate server for communicating with a first network component via a first communication connection that optimizes data transfer latency, bandwidth or both between said first intermediate server and the first network component, said first intermediate server being dynamically selected from a first pool of available first intermediate servers on a periodic basis between a week and a month, inclusively, and performed based upon a predetermined event-based criteria occurring proximate to one or more of the available first intermediate servers in the first pool, wherein the predetermined event-based criteria includes occurrence of a power outage or an earthquake proximate to the one or more of the available first intermediate servers in the first pool, the available first intermediate servers each being configured for communicating with the first network component via respective first communication connections;
- a second intermediate server for communicating with a second network component via a second communication connection that optimizes data transfer latency, bandwidth or both between said second intermediate server and the second network component, said second intermediate server being dynamically selected from a second pool of available second intermediate servers on a periodic basis between a week and a month, inclusively, the available second intermediate servers each being configured for communicating with the second network component via respective second communication connections;
- a high-speed communication connection with one or more multi-path communication protocol standards for providing high-speed communications between said first and second intermediate servers; and
- a direct communication connection between the first network component and the second network component,
- wherein said first and second intermediate servers communicate via at least one of the high-speed communication connection and the direct communication connection and said high speed communication connection accelerates data exchanges between the first and second network components.

18. The system of claim 17, wherein said first intermediate server is geographically proximate to the first network component, wherein said second intermediate server is geographically proximate to the second network component or both.

* * * * *